(12) United States Patent
Bruchlos et al.

(10) Patent No.: US 11,157,915 B2
(45) Date of Patent: *Oct. 26, 2021

(54) AUTOMATIC CREATION AND CONFIGURATION OF LICENSE MODELS AND POLICIES

(71) Applicant: Green Market Square Limited, Road Town (VG)

(72) Inventors: Joachim Bruchlos, Calw (DE); Joachim Hagmeier, Stuttgart (DE); Dietmar Kuebler, Altdorf (DE); Timo Kussmaul, Boeblingen (DE)

(73) Assignee: Green Market Square Limited

( * ) Notice: Subject to any disclaimer, the term of this patent is extended or adjusted under 35 U.S.C. 154(b) by 196 days.

This patent is subject to a terminal disclaimer.

(21) Appl. No.: 16/653,125

(22) Filed: Oct. 15, 2019

(65) Prior Publication Data

US 2020/0043013 A1    Feb. 6, 2020

Related U.S. Application Data

(63) Continuation of application No. 10/876,023, filed on Jun. 24, 2004, now Pat. No. 10,521,800.

(30) Foreign Application Priority Data

Sep. 30, 2003    (EP) ..................................... 03103628

(51) Int. Cl.
*G06Q 30/00*    (2012.01)
*H04L 29/08*    (2006.01)

(52) U.S. Cl.
CPC .............. *G06Q 30/00* (2013.01); *H04L 67/02* (2013.01)

(58) Field of Classification Search
CPC ...................................................... G06Q 30/00
See application file for complete search history.

(56) References Cited

U.S. PATENT DOCUMENTS

| 5,671,412 A | 9/1997 | Christiano |
| 5,715,403 A | 2/1998 | Stefik |
| 5,742,757 A | 4/1998 | Hamadani |

(Continued)

OTHER PUBLICATIONS

IBM: List of IBM Patents or Patent Applications Treated as Related (Appendix P), Mar. 10, 2020, pp. 1-2.

*Primary Examiner* — Azam A Ansari
(74) *Attorney, Agent, or Firm* — Van Pelt, Yi & James LLP

(57) ABSTRACT

Provided are techniques for providing licensed access to application services based on a contract that specifies conditions for usage of the software application services by a service requester, access to the software application services being provided over a network under different license types, each license type defining a particular usage condition, including a service handler implementing a runtime environment, retrieving service requester profile data associated with the service request; retrieving an identified and validated contract associated with the service request by utilizing requester profile data; receiving license condition data corresponding to the identified contract; retrieving contract information corresponding to the identified and validated contract; receiving, by the licensing service component, usage data; comparing the received usage data with the received license condition data and determining availability of two or more licensing options to satisfy the service request and providing the service in accordance with one of the licensing options.

15 Claims, 8 Drawing Sheets

(56) References Cited

U.S. PATENT DOCUMENTS

| | | | |
|---|---|---|---|
| 5,870,543 | A | 2/1999 | Ronning |
| 5,883,954 | A | 3/1999 | Ronning |
| 5,883,955 | A | 3/1999 | Ronning |
| 5,887,060 | A | 3/1999 | Ronning |
| 5,893,132 | A | 4/1999 | Huffman |
| 5,903,647 | A | 5/1999 | Ronning |
| 5,907,617 | A | 5/1999 | Ronning |
| 5,961,590 | A | 10/1999 | Mendez |
| 5,968,131 | A | 10/1999 | Mendez |
| 5,991,750 | A | 11/1999 | Watson |
| 5,991,876 | A | 11/1999 | Johnson |
| 6,023,708 | A | 2/2000 | Mendez |
| 6,052,717 | A | 4/2000 | Reynolds |
| 6,085,192 | A | 7/2000 | Mendez |
| 6,112,181 | A | 8/2000 | Shear |
| 6,131,116 | A | 10/2000 | Riggins |
| 6,141,754 | A | 10/2000 | Choy |
| 6,151,606 | A | 11/2000 | Mendez |
| 6,993,664 | B2 | 1/2006 | Padole |
| 7,353,194 | B1 | 4/2008 | Kerker |
| 2003/0110138 | A1 | 6/2003 | Van Do |
| 2003/0220880 | A1 | 11/2003 | Lao |
| 2005/0071276 | A1 | 3/2005 | Bruchlos |

Figure 1
(Prior Art)

```
POST /StockQuote HTTP/1.1
Host: www.stockquoteserver.com
Content-Type: text/xml; charset="utf-8"
Content-Length: nnnn
SOAPAction: "http://example.org/2001/06/quotes"

<env:Envelope xmins:env="http://www.w3.org/2001/06/soap-envelope">
<env:Body>
<M:GetLastTradePrice
      env:encodingStype="http://www.w3.org/2001/06/soap-encoding"
      xmlns:m="http://example.org/2001/06/quotes">
<symbol>IBM</symbol>
</m:GetLastTradePrice>
</env:Body>

</env:Envelope>
```

Figure 2
(Prior Art)

```
<Method> <request-URI> <HTTP-version>
Header field 1
...
Header field n
(blank line)
Message body
```

Figure 3
(Prior Art)

```
<SOAP: Envelope>
  <SOAP: Header>
    Header field 1
  ...
  Header field n
  </SOAP: Header>
  <SOAP: Body>
  Body field 1
  ...
  Bodyfield n
  </SOAP:Body>

<SOAP: Envelope>
```

Figure 4
(Prior Art)

```
<Method> <request-URI> <HTTP-version>
Header field 1
...
Header field n
(blank line)
<SOAP: Envelope>
        <SOAP: Header>
        Header field 1
        ...
        Header field n
         </SOAP: Header>
         <SOAP:Body>
        Body field 1
        . . .
        Body field n
          </SOAP:Body>
</SOAP: Envelope>
```

Figure 5A
(Prior Art)

```xml
<?xml version="1.0"?>
<definitions name="StockQuote"
targetNamespace="http://example.com/stockquote.wsdl"
    xmlns:tns="http://example.com/stockquote.wsdl"
    xmlns:xsd 1 ="http://example.com/stockquote.xsd"
    xmlns:soap="http://schemas.xmlsoap.org/wsdl/soap/"
    xmlns="http://schemas.xmlsoap.org/wsdl/">
 <types>
  <schema targetNamespace="http://example.com/stockquote.xsd"
    xmlns="http://www.w3.org/2000/1 0/XMLSchema">
   <element name="TradePriceRequest">
    <complexType>
     <all>
      <element name="tickerSymbol" type="string"/>
     </all>
    </complexType>
   </element>
   <element name="TradePrice">
    <complex Type>
     <all>
      <element name="price" type="float"/>
     </all>
    </complexType>
   </element>
  </schema>
 </types>
 <message name="GetlastTradePriceInput">
  <part name="body" element="xsd1 :TradePriceRequest"/>
 </message>
```

Figure 5B
(Prior Art)

```
<message name="GetlastTradePriceOutput">
  <part name=" body" element="xsd1 :TradePrice"/>
</message>

<portType name="StockQuotePortType">
  <operation name="GetlastTradePrice">
    <input message="tns:GetlastTradePriceInput"/>
    <output message="tns:GetlastTradePriceOutput"/>
  </operation>
</portType>
<binding name="StockQuoteSoapBinding" type=
  "tns: StockQuotePortType">
<soap: binding style="document" transport=
  "http://schemas.xmlsoap.org/soap/http"/>
<operation name="GetlastTradePrice">
  <soap:operation soapAction=
    "http://example.com/GetlastTradePrice"/>
  <input>
    <soap: body use="literal"/>
  </input>
  <output>
    <soap: body use="literal"/>
  </output>
 </operation>
</binding>
<service name="StockQuoteService">
  <documentation>My first service</documentation>
  <port name="StockQuotePort" binding="tns:StockQuoteBinding">
    <soap:address location=
      "http://www.stockquoteserver.com/StockQuote"/>
  </port>
 </service>
</definitions>
```

AUTOMATIC CREATION AND CONFIGURATION OF LICENSE MODELS AND POLICIES

CROSS-REFERENCES TO RELATED APPLICATIONS

The present application is a continuation and claims the benefit of the filing date of an application entitled, "Method for Automatic Creation and Configuration of License Models and Policies" Ser. No. 10/876,023, filed Jun. 24, 2004, assigned to the assignee of the present application, and herein incorporated by reference.

FIELD OF DISCLOSURE

The present invention relates to the field of networked computer telecommunication, and in particular to a method and system for processing services associated with a contract between a service requester (SC) and a service provider (SP) wherein said services are to be provided via a network, wherein at least one service contract is defined between said service requester and said service provider.

BACKGROUND OF THE INVENTION

Web services define a technique for describing software components to be accessed, methods for accessing these components, and discovery methods that enable the identification of relevant service providers. Web services are programming language-, programming model-, and system software neutral.

In this regard, two prior art Web services standards are relevant. They are shortly sketched out and commented as follows in order to introduce into the problems concerned in prior art:

First, the Simple Object Access Protocol (SOAP) provides a means of messaging between a service provider and a service requester. SOAP is independent of the underlying transport protocol, SOAP payloads can be carried on HTTP, FTP, JMS and other protocols.

FIG. 1 gives a SOAP example carried by the HTTP POST request.

HTTP messages consist of requests from client to server and responses from server to client. Both types of message (Request and Response messages) consist of a start-line, zero or more header fields (also known as "headers"), an empty line indicating the end of the header fields, and possibly a message-body.

The structure of a HTTP request message is depicted in FIG. 2: the first line of that message specifies the method to be applied to the resource, the identifier of the resource, and the HTTP protocol version in use. The HTTP protocol defines multiple request methods like GET, HEAD, POST, PUT, DELETE, TRACE, CONNECT, OPTIONS. The method indicates the operation to be performed on the resource.

The resource upon which to apply the request is identified by a Request-URI, which is a Uniform Resource Identifier. Uniform Resource identifiers are simply formatted strings, which identify—via name, location, address or any other characteristic—a resource. For example: The well-known HTTP URL scheme used to locate network resources via the HTTP protocol contains resource-URIs. The scheme specific syntax and semantics for http URLs are http_URL="http:" "//"host[":"port][request-uri].

If the port is empty or not given, port 80 is assumed. The semantics are that the identified resource is located at the server listening for TCP connections on that port of that host, and the Request-URI identifies the resource. The syntax and semantics for Request-URI are Request-uri=abs-_path["?"query-string]

where the abs_path is an identifier of the resource and the query string is any kind of information which can be used for processing the request.

The header fields carry meta-information associated with the request or response.

The message-body of an HTTP message is used to carry the entity-body associated with the request or response. The message body depicted in FIG. 2 contains the actual SOAP message, which has a structure as given in FIG. 3: Inside An envelope section a number of header fields 1, . . . n are defined, which construct the so called SOAP header, which is followed by the actual SOAP body, which comprises a second number of so called "Body fields 1, . . . n.

Thus, the overall structure of a SOAP message carried over a network e.g. by a transport protocol like HTTP is depicted as a conglomeration of FIGS. 1 to 3 in FIG. 4.

FIG. 1 gives a SOAP example carried by the HTTP POST command. The HTTP request method is POST, the resource-URI is "/StockQuote", which is an absolute path identifying the resource for which the request is intended. The resource-URI does not contain a query string.

Beside SOAP, there is in prior art the above-mentioned second relevant Web Service standard:

The Web Services Description Language (WSDL) is an XML document for describing Web Services as a set of endpoint operations on messages containing either document-oriented or Remote Procedure Call (RPC) payloads. So called service interfaces are defined abstractly in terms of message structures and sequences of simple message exchanges (or "operations" in WSDL terminology). They are then bound to a concrete network protocol and data-encoding format to define an endpoint. Related concrete endpoints are bundled to define abstract endpoints (services).

WSDL supports a service interface definition that is distinct from the protocol bindings used for service invocation. WSDL allows for multiple bindings for a single service. The service interface definition and the access binding are also distinct from the implementation of the functionality of the service. Service requestors usually generate client stub code for a web service from the corresponding WSDL; the WSDL of a service is usually requested from the service provider. The client stub code implements the necessary logic to create the correct message structure and the correct data encoding to address the endpoint. Since there is a distinction between definition, binding and implementation of a service, client stub codes created for a certain definition and binding can usually address various endpoints without requiring code changes, simply by using another endpoint address. FIG. 5A and the continuation thereof, FIG. 5B is given to disclose an exemplary WSDL document with further details to a person skilled in the art.

An important feature of Web Services is that they are stateless, according to a request-response scheme. A stateless server is one, which treats each request as an independent transaction, unrelated to any previous request. This simplifies the server design because it does not need to allocate storage to deal with conversations in progress or worry about freeing it if a client dies in mid-transaction. A disadvantage is that it may be necessary to include more information in each request and this extra-information will need to be interpreted by the server each time.

Having now described the constraints in which electronic communication of the above-mentioned kind runs, the disadvantages of prior art will be described next below:

Commercial usage of web services is based on a contract concluded between the service provider and the service requester. Such contract represents an agreement about the conditions for using and provisioning web services or web applications. The contract details may specify the conditions for billing the service, i.e. the price, service levels specifying the desired quality of service in a more detailed way, and further information which is highly critical for both the service requestor and the service provider. Basically, in prior art business, there are no limitations regarding the scope of a contract or the number of contracts: one contract may contain multiple services, or one service may be contained in multiple contracts, which are all valid at the same time.

In a typical prior art scenario, either two parties, ie, the Service Requester or Service Consumer, referred to herein as SC, and the Service Provider, referred to as SP, communicate, or three parties are comprised of the Web service Communication, i.e. the Service Requester, the Service provider who manages the above contracts and the Service Supplier, referred to as SS, which actually performs the service, which is sometimes hold invisible to the requester.

The only disclosure of such prior art, which is thus elaborated to address the above-mentioned web services facilities is published in "IBM Web Services Toolkit" ("Emerging Technologies Toolkit"), available in the year of 2002 for a trial period of 60 days based on IBM Alphaworks license agreements.

A short review on a software component as it is disclosed there, which is called "Contract Service" and comprises the most technical features relevant for the present invention is given, as follows:

The Contract Service handles the relationship between service providers and service requesters. It provides information about the type of contract between a service provider and the service hub (deployment contracts, also known as provider contracts) and between a service requestor and the service hub (usage contracts). Usage contracts can be used to subscribe to any combination of operations of any service provided through the service hub. A usage contract contains information such as how calls to service operations are to be charged for (by time, by number of uses, by amount of use etc.) and how much the subscribed service operations should cost for that client. For each usage contract the Contract Service defines the payment method and rating model to be used, the effective dates for that contract. Contracts may optionally store the digital signatures of both parties (service hub and service provider/requestor) to the contract. In the Utility Service demo that is shipped with the Web Services Toolkit, contracts are added to the Contract Service via a Utility Services Portal supplied with the demo, and a valid contract must be in place between a service hub and a service requestor before the requestor can use the service.

In this prior art contracting system for web services there are a number of disadvantages, introduced as follows:

Web services define a technique for describing software components the execution of which may have a considerable business value for a client, they describe how such web services are accessible by the clients and they describe discovery methods that enable the identification of relevant service providers to a client. Web services are mostly programming language-, programming model-, and system software neutral. Web services as described above are of high importance for the next future because they form a key part of dynamic e-business, and in particular of e-business on demand.

E-business on demand requires besides metering and accounting of services sophisticated systems to deal with the contractual relationships that have to be in place before actual on demand services can be offered to a client.

There is a remarkable similarity between e-business on demand and prior art software usage: in both fields a client is ready to pay some money in order to use a piece of software the execution of which serves him to get some predefined business value. As in prior art software usage different types of licenses are known and are useful to be customised to the specific needs of a customer it would be strongly desirable also to implement a licensing facility into such prior art contract management system, which performs the web services in favour to a client. The problem is that licensing may be considered as a special case, i.e. a special way of contracting for software usage. Disadvantageously the prior art contracting systems for performing web services do not offer any licensing until now. A specific difficulty for simply implementing existing licensing business methods into electronic web service management is that the user would need a high degree of personalisation in the licenses, the vendor or provider of a web service cannot implement in program form all desired individual license types which are object of face-to-face negotiations between a service provider and a service requestor. Thus, the contract and license management basically falls into two categories:

a) high level contracting and b) low level contracting.

High level contracting deals with the above-mentioned face-to-face negotiations for agreeing on given contract conditions, while low level contracting deals with the runtime implementations of contract attributes as far as they are agreed on by both contracting parties. Personalised licenses between a service provider and a service requestor of web services require a great manual afford and are usually only set up with customers requiring enough licenses to be worth the afford of negotiation.

One of the disadvantageous limitations of the prior art contract management is that a one-to-one relationship exists between the consumer and the provider of a service offering exists. This represents a major problem to introduce this system to large scale environments, where for instance enterprises want to contract services for a number of consumers, for example a large number of employees using such services. If prior art contract management systems was enriched with existing software licensing know-how, the client could only choose from predefined licenses with a pre-set number of conditions, under which he can use the software or the service. If non of the offered licenses meets his requirements he will have to accept a license, which does not really fit his needs or, alternatively he cannot use the software or the service at all.

In many business situations the negotiations of different license policies, as it is basically desirable for a client, requires to much interaction in the sales process to be worth the effort for the service supplier. Further, it is also not possible to use well-known and established usage models as they are used in prior art software licensing, as prior art software licensing is coupled to offline processes for situations, in which the usage of a licensed software is done offline and independently from the software provider or the software seller.

SUMMARY

It is thus an objective of the present invention to improve prior art methods of performing web services. This objective of the invention is achieved by the features stated in enclosed independent claims. Further advantageous arrangements and embodiments of the invention are set forth in the respective subclaims. Reference should now be made to the appended claims.

According to the basic aspect of the present invention as defined in claim 1 a basic approach for improving prior art delivering of web services is disclosed, wherein a service consumer may issue a request for a service with using information included in the request, which comprises a kind of user-ID, which enables a service provider to select a valid contract between the service consumer and the service provider. Furthermore, at the service provider site, a customer-specific licensing model is instantiated preferably automatically during runtime by using existing license subcontracts and respective licensing software components in cooperation with a service metering component storing all necessary usage information on usage of services actually provided or provided prior to the current service request, in order to find a respective particular license model, which matches best the actual needs of the client, and which is covered by the contractual scope of the negotiated contract terms and conditions. Thus, different license policies can be followed adaptable to the specific needs of a service requester.

A preferred way to do that is to offer a plurality of different license types, which is able to cover most of the clients' needs, as experience shows. An advantageous collection of different license types comprises the following types:
  a) a consumptive type, in which only a specific number of requests for the service are allowed optionally, this may be related to a predefined time period, in which that number of requests must be performed;
  b) a "concurrent" license type, wherein only a specific number of simultaneous requests of the service are allowed;
  c) a time-based license type, wherein service requests are allowed only at specific times. This can either be periodic, for instance Monday to Friday or single type, as for instance January to July 2003;
  d) a name-related license type, in which only predefined principles listed in the license policy are allowed to request the service. By that, for example a group of 4 persons can use a service;
  e) a "base" type license, wherein no access regulations or usage conditions must be kept, meaning that a service request will be always allowed independently of time, historic consumption and the number of concurrent accesses, which may be preferably granted to a limited number of persons only;
  f) a usage condition license type, in which a license policy specifies any predefined usage condition, for example the condition that any reselling of the provided service is not allowed of cause other conditions may exist, which depend clearly from the particular situation and field of use.

The above-mentioned different license types are referred to be "atomic" license types because each individual license type addresses one single and complete separate aspect of usage conditions. Further advantageously said atomic license types can be combined in order to be able to offer a large number of different license models to the customer, a preferred feature, which is not known yet in the world for web services. A combined license type can be obtained by associating an individual, predetermined fraction, for instance percentage of each atomic license type to the combined one, which preferably also may be used for billing purposes.

Further advantageously the definition of a license or the definition of multiple license types according to the present invention is part of an electronic document specifying the contract underlying to said licenses. By that the advantage results that contract information and license type information is stored close to each other, which increases the ease of use when maintaining those data.

Further, when the contracting system implementing the different license types according to the present invention further includes a metering software component designed and defined for metering the technical details of the requested services, in particular those details, which may be used to form part of the billing process postponed to the service itself, and when said metering data associated with a current contract ID is read and used for a checking step in order to make a decision if or if not to allow a service provision, then one and the same contract management system comprises all technical software components in one single system, which is needed for efficiently operating the requested services as well as generating the billing procedure associated with the service.

When further a license verification program module is used having a modular structure for each license type, and if those modules are sequentially operated on when processing an incoming request, then the additional advantage results that the inventional concept is easily to be extended for more license types without being constrained to append much meta-logic around such new module. Further, the inventional concept can be integrated in a contract management system that comprises a profile handler, a contract handler and a metering request handler, wherein such handler components cooperate with respective remotely operated services, i.e. a profile service for checking and validating the personal identity of the requesting person, a contract service for checking the usage of the contract and a metering service for metering any service-relevant entities such as time of usage, amount of data transferred via network, etc., then respective parts of processing can be performed at locations best suited for collecting and processing the respective type of data.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

The present invention is illustrated by way of example and is not limited by the shape of the figures of the drawings in which:

FIG. 1 is a code section representation showing a prior art SOAP request message contained in a HTTP POST request message;

FIG. 2 is a code section representation showing the structure of a prior art HTTP request;

FIG. 3 is a code section representation showing a detail structure of a prior art SOAP message;

FIG. 4 is a code section representation showing the overall structure of a prior art SOAP message contained in a HTTP POST request message;

FIG. 5A is a code section representation showing a section of a prior art exemplary WSDL document used for describing web services;

FIG. 5B is the continuation of FIG. 5A;

DETAILED DESCRIPTION

Figure 6:
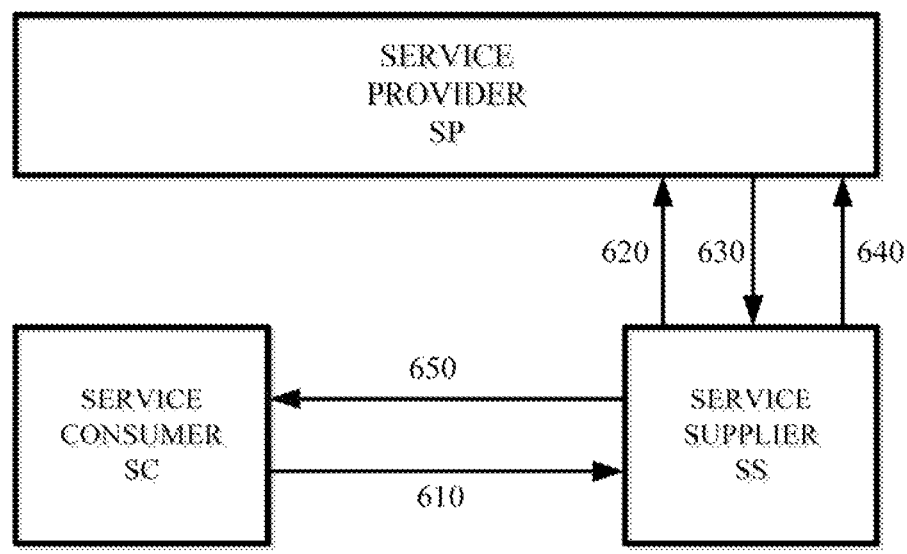
FIG. 6 is a schematic representation of the relationships between Service Consumer, Service Supplier and Service provider according to a preferred embodiment of the inventional method.

With reference to FIG. 6 a scenario is described in which the service supplier abbreviated further as SS offers the service to the Service Consumer, abbreviated as SC. The Service Provider abbreviated as SP realizes the main part of the contract management infrastructure including the main inventional software components.

This results in the following interactions, which are implemented according to this embodiment in the respective program module(s) as "steps" of a respective inventional method used by the parties SC, SS, and SP. The steps are enumerated as depicted in the drawing:

Step 610: SC initiates a service request in order to invoke a business service, which is provided by SS. SS receives the request.

Step 620: SS sends a service request to SP in order to use the contracting system and infrastructure services provided by the SP. In particular, in this embodiment the contracting system services comprise the contracting service, and the infrastructure services are metering service and profiling service.

Step 630: SP performs the requested contracting system and infrastructure services, e.g. verifies that a valid contract is available, initiates a meter event and returns the status to SP.

Step 640: SS performs the requested service and invokes SP in order to generate adequate meter events.

Step 650: SS sends data representing the service result to SC.

Figure 7:
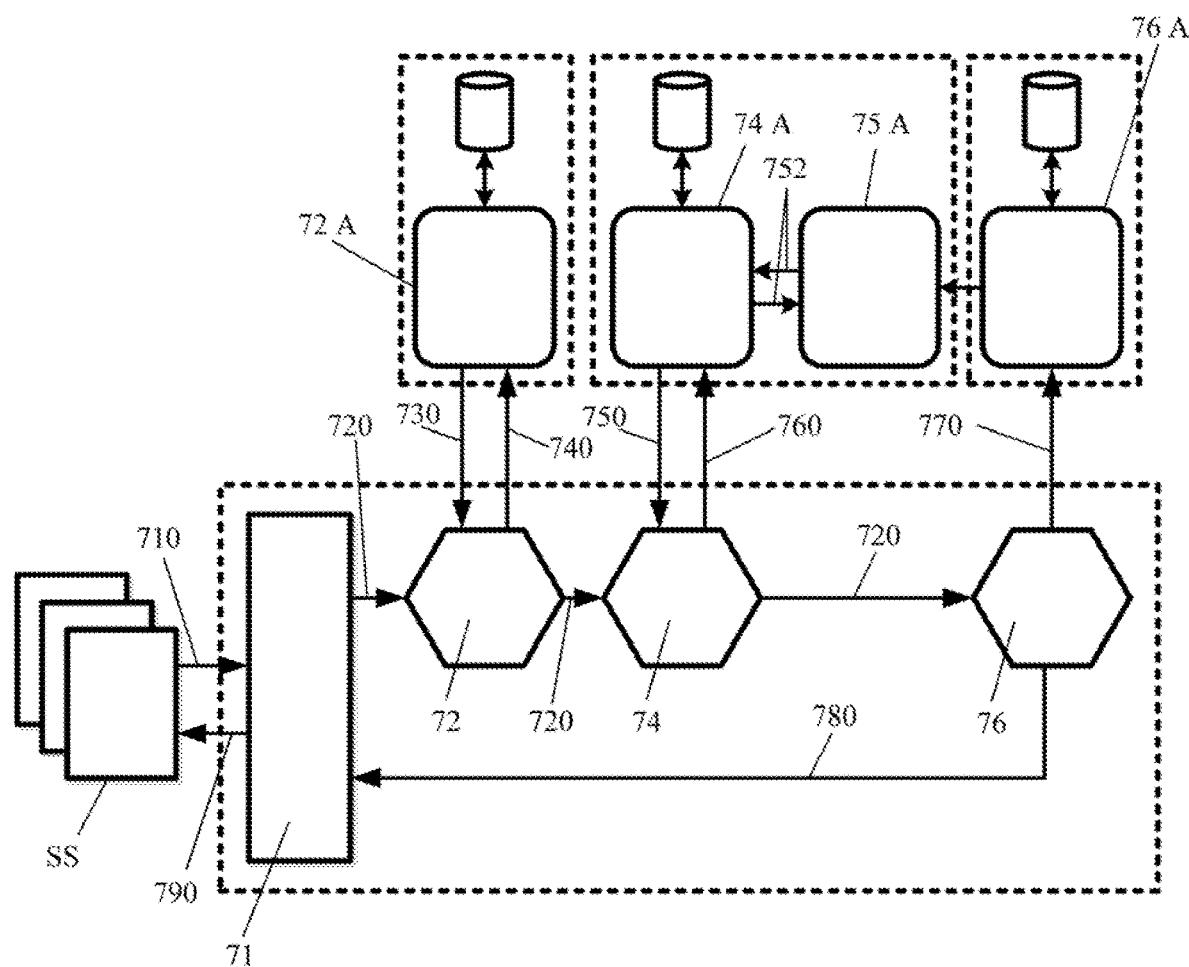
FIG. 7 is a schematic representation of the main structural elements being used in the scenario given in FIG. 6.

The implementation of step 620 is shown in FIG. 7 in more detail: The service provider realizes an application server, depicted with a dotted-line frame, which contains a servlet 71, implementing the runtime environment for service requests, for example a web service runtime environment like Apache Axis.

The application server also contains multiple handler components denoted with reference signs 72, 74, 76. These handlers realize a local implementation of the infrastructure components F-H, which may be realized on remote servers for example as further web services. The handlers 72, 74, 76 provide local functionality needed to handle the communication with the remote services:

A Profile Handler 72 uses external Profile Service 72A in order to verify the requester's identity.

A Contract Handler 74 uses external Contract Services 74A in order to verify the contract state and contract validity.

A Metering Handler 76 generates adequate meter events (start-, end-, adhoc-, cancel events, etc).

The components 71, 72, 74, 76 (servlet and handlers) run in a shared memory environment and communicate through shared data.

The servlet 71 ensures that the handlers are invoked in the correct order.

The infrastructure services are described next below:

The Profile Service 72A may be basically used as available in above-described prior art.

The Profile Service provides access to user profile information like name, address, user-ID, etc. Depending on the implementation, this may be expanded to include more information. The Profile Service may be used to save, delete and get profile information.

For the other services to work correctly, all users of business services must have a profile assigned by the Profile Service. Profiles may be created in advance by using a user interface or by directly editing the XML file that holds profiles. This Profile Service can be replaced by any other identity system like Tivoli Identity Manager.

The Contract Service 74A implements a prior art contracting management concept adapted to integrate the inventional licensing component.

The Metering Service 76A receives meter events, as explained below, persistently stores the meter events and retrieves meter events upon request. According to this preferred embodiment the Metering Service may be used in conjunction with contract information from the Contract Service 74 to produce a usage report for a particular client using a particular service. It should be noted that the contract service 74A and the metering service 76A both are connected for a data exchange with an inventional Licensing Service component 75A.

This inventional Licensing Service 75A cooperates with the Contract Services 74A and the Metering Service 76A in order to match best the SC's service usage with the agreed license situation. More details are described later below.

The Metering Service 76A supports three types of operations:
  recordMeterEvent—saves one meter event
  recordMeterEvents—saves multiple meter events
  getMeterEvents—retrieves multiple meter events from the Meter Service Meter events contain the service name and the operation name of the service that was called, timestamps, as well as the ID of the contract used to handle the request. Meter events vary by type, so various ways of charging a service call are possible:
  Start/end events are used when access to a service is charged by the amount of time used to perform the service;
  ad-hoc events are used when access is charged for by the number of times that the service is accessed, or on some other basis besides time.

In addition to the above, two more types of events are available:
  a) The event "cancelled", which is used to cancel an event, which has already been sent to the metering service, and
  b) the event "unknown", which is used when the type of event was not supplied by the service requestor.

The interactions between the above described software components are as follows:

Step 710: Servlet 71 receives the service request initiated by a Service Supplier, extracts the message context and passes it on to subsequent handler components.

Step 720: The message context, a shared data object, passes sequential handler components. The handlers extend/modify the message context and pass it on to the next handler in the chain.

Step 730: The Profile Handler 72 initiates a service request to an external Profile Service 72A comprising a respective database application in order to check the Service Supplier's identity.

Step 740: The Profile Service 72 returns the identity checking result to the SP's Profile Handler.

Step 750: The Contract Handler calls an external Contract Service 74A in order to identify and validate a corresponding contract: It calls the "getUsageContractsForValidForIdentity" operation and passes the service consumer identity taken from the Profile Service result.

According to this preferred embodiment the Contract Service 74A reads the contract ID and then uses a valid contract for this identity. According to a preferred embodiment of the invention the Contract Service 74A, stores license condition data within respective contract documents in a Contract Service database. Said Contract Service cooperates with said above introduced inventional software component, referred to as License (Verification) component 75A, which ensures that the service request complies to the license policies predefined in the contract. The details thereof are further explained with reference to FIG. 10.

According to a preferred way of implementing this, an implementation variant A, referred to as step 752, is as follows:

The License component 75A requests actual or historic usage data from the Metering Service 76A mentioned above. This data is used to evaluate specific types of license policies for instance consumptive, concurrent, etc., as described above.

According to a useful alternative an implementation variant B is proposed, in which the License component 75A has the current usage data and uses this data to perform the evaluation. The license evaluation itself is described in more detail with reference to FIG. 10.

Step 760: The Contract Service 74A returns the state and validity of license and contract situation to the SP's Contract Handler. If no valid contract or licensed usage conditions are found, an exception is thrown, and the service request may be rejected.

Step 770: The Metering Handler 76 invokes an external Metering Service 76A in order to generate meter events, which reflect the status of the business service call.

Step 780: The Metering Handler returns the updated message context to the Servlet. According to above variant B the Metering Service 76A notifies the License component 75A about the usage of the service. The License Component uses this information for the validation of certain license policies, e.g. consumptive or concurrent license usage, see step 750.

Step 790: The Servlet 71 returns the result of the initial service call (request) to the Service Supplier in step 790.

Figure 8:
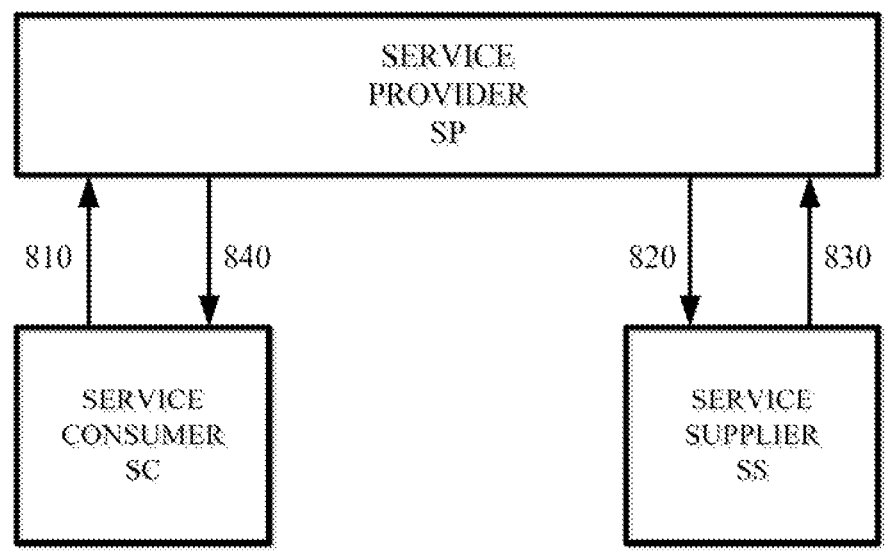
FIG. 8 is a schematic representation of the relationships between Service Consumer, Service Supplier and Service provider according to further preferred embodiment of the inventional method enriched by the inventional license processing component.
Figure 9:
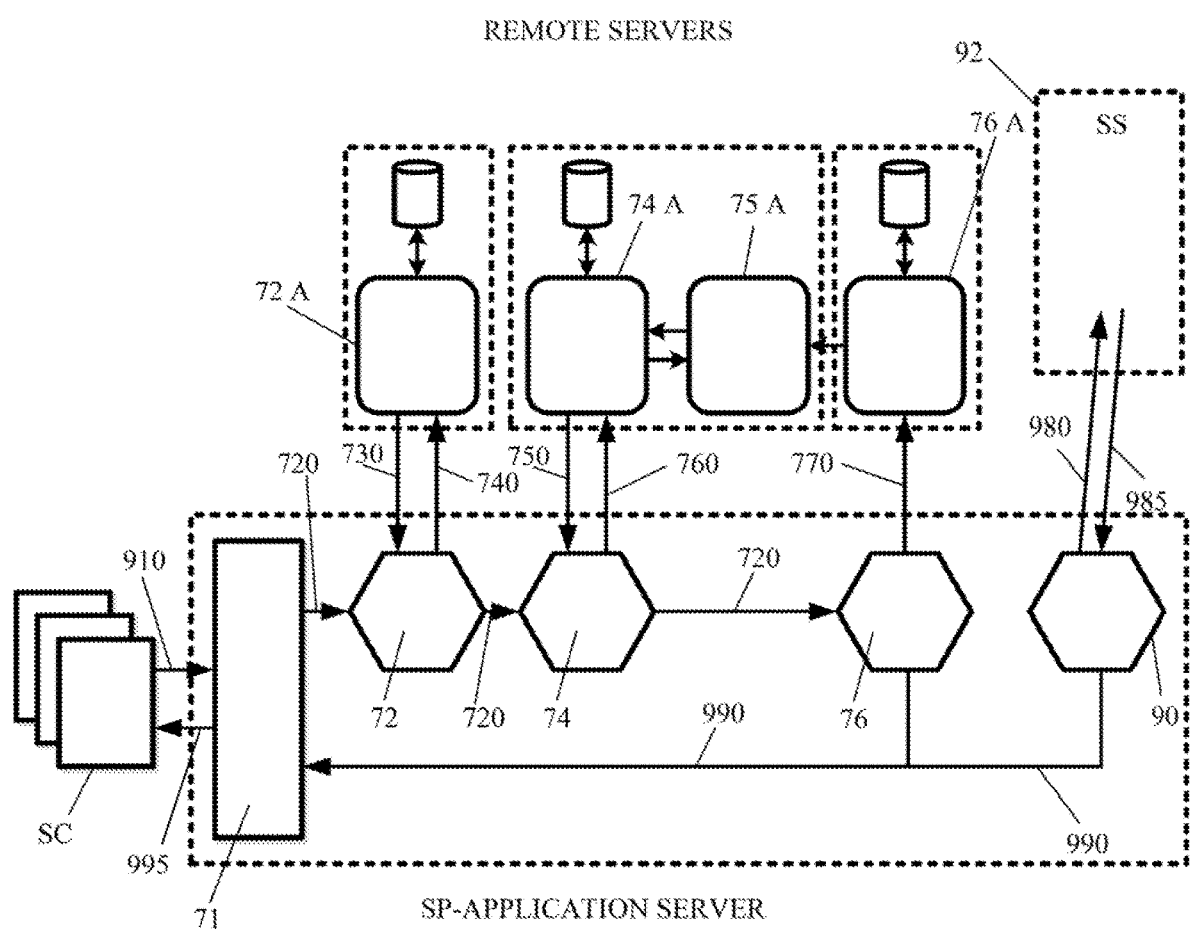
FIG. 9 is a schematic representation of the main structural elements being used in the scenario given in FIG. 8.

In an alternative scenario and with reference to FIGS. 8 and 9, the Service Provider offers the service to the Service Consumer. In order to fulfill a service request, the Service Provider requests the service from the Service Supplier. In particular, in:

Step 810: SC requests a business service from SP;

Step 820: SP uses the contract system and the infrastructure services to verify that a valid contract is available, initiates a start meter event and then requests the service from the SS;

Step 830: SS performs the service and returns results to SP; and

Step 840: SP generates end meter event and returns business service results to SC.

The inventional implementation is shown and will be described with reference to FIG. 9:

The service provider realizes an application server as described above with reference to FIGS. 6 and 7. Thus, mainly the differences are described next below:

According to this particular embodiment a Service Handler 90—see right margin of FIG. 9—invokes, see step 980—the external business service, which is provided by a Service Supplier (SS), step 985.

The components Servlet 91, and handlers 72, 74, 76, and 90 again run in a shared memory environment and communicate through shared data. The servlet 91 has only respective differences to that one described above in FIG. 7, which yield from the particular differences in scenario 2, and ensures that the handlers are invoked in the correct order.

A business web service 92 is an external server component provided by the Service Supplier; it is called in a step 910 by the Service Consumer SC, in order to fulfill the requested service call.

In particular, the interactions between these components are as follows:

Step 910: Servlet 91 receives the service request initiated by a Service Consumer (SC), extracts the message context and passes it on to subsequent handler components.

Steps 720 to 770—see Scenario 1 above for reference.

Step 980: The Service Handler 90 invokes the requested business service 92 and updates the message context with the resulting service responses and in Step 985: returns it to the Service Handler 90.

Step 990: The Service Handler returns the updated message context to the Servlet 91.

Step 995: The Servlet 91 returns the result of the initial call to the Service Consumer.

Figure 10:
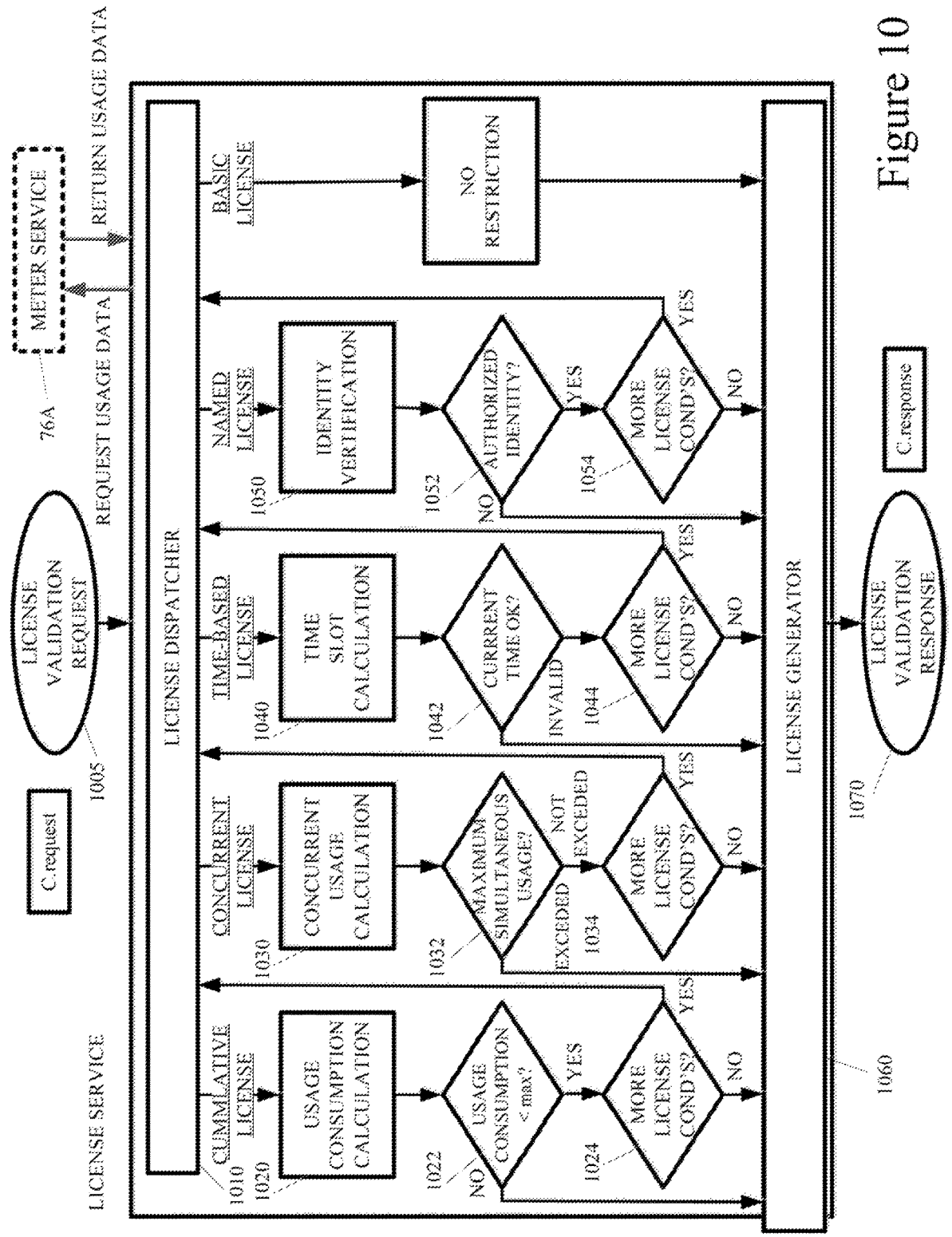
FIG. 10 is a schematic representation illustrating the control flow in an exemplary embodiment of a license processing software component according to the invention.

The Licensing Component 75A logic is illustrated in FIG. 10.

The Contract Service 74A requests, see step 1005, the validation of a license for a given Service Consumer (principal) and a given service from the License Component 75A. The SC request indicated as C.request contains the contract, which comprises the license representation.

According to FIG. 10 each license policy is evaluated specifically in a predetermined sequence, which is given in here exemplarily only. The control thereof is implemented in a License dispatcher 1010.

The calculation 1020 of usage consumption and concurrent usage 1030 is based on metering data, which is requested and input from the Metering Service 76A via dispatcher 1010.

In step 1020 the usage consumption is calculated, i.e., questions like: "how often was the service consumed by this principal up to now", "how often was the service requested by this principal in the current time period", etc., are posed and answered by a respective Metering data evaluation as part of step 1020. The usage consumption is then compared to the limit defined in the license, see step 1022. If the accumulated usage is still lower than delimited in the contract license section describing the consumptive aspect thereof, a further decision 1024 is taken to check, if more license types are available for the contract. In the YES-branch of decision 1024 it is branched back to the license dispatcher 1010, which enters a similar control flow for the next license type, see calculation 1030, 1040, or 1050.

Thus, the license management may be continued with the evaluation of remaining license types, in order to charge the consumer according to the negotiated terms and conditions in the contract. This may also include that a service is charged in a combination of several license types. Or it may mean that the most advantageous "flat rate" (no-restriction/unlimited-use license) aspect is made effective for the service, if this is possible at least for parts of the service to be provided, as for example in a situation, in which 50% of the service is covered by the Concurrent Usage license type, and the other 50% is covered by time slot license type.

In the NO-branch of decision 1024 there are no further licenses. Thus, the license generator stores that the current request is supported by the consumptive type license part, and issues a respective positive license validation response in favor to the SC.

With reference back to decision 1022, otherwise, in the NO-branch thereof, that is, if the current usage has exceeded the usage allowed by the usage consumption license type, control is transferred to the license generator 1060, which issues a respective negative license validation response for instance accompanied by a rejection message for the requested service.

The dispatcher 1010 initiates then a step 1030, which calculates the concurrent usage ("how many concurrent service requests originated by this principal are currently executed?"). The control flow is similar to that one described above with steps 1022, and 1024, but adapted to the number concurrent users.

In step 1032, the current usage data is requested from the Metering service 76A. The license service 75A issues a respective request to the Metering Service. Depending on the actual embodiment of the inventional method, two different types of requests can be distinguished: The first requests data about the number of times the service was requested before, and the second type requests data about the number of times the service is currently in use. Both requests take the similar parameters, which can be processed by the Metering Service 76A.

In a similar way as described above, the steps 1032, 1034, (concurrent usage type) 1040, 1042, and 1044 (Time slot license type), as well as 1050, 1052, 1054 (Identity-based license type) are performed. If there is a restriction-free license type also agreed upon, this may be used also, if the request is not covered by the precedingly mentioned license types.

Further, depending on the actual embodiment and application in use, steps 1020, 1022, and 1024 and/or steps 1030, 1032, 1034 may trigger the activation of the Metering Service 76A and may use the new Usage Data for the validation. Alternatively, said activation is performed independently, and the usage data is stored, then referenced in ensuing steps 1020, 1022, and 1024 and/or steps 1030, 1032, 1034.

In another variation of an inventional aspect, the metering service 76A may push the usage data to the License component 75A. The License component receives these notifications and stores the usage data; it will then not issue a respective request as mentioned above.

A Response Generator 1070 creates the overall validation: The overall result is "success", if each license policy is validated successfully.

As should reveal from the foregoing description, the present invention extends the before-mentioned prior art by establishing the concept of a license: A license specifies access regulations and usage conditions for one or multiple principals for example a user, a group of users, a computer resource or an application identified by a unique name etc.

A license is expressed according to the invention as a license policy or a combination of multiple license policies. A license policy defines an aspect of an access regulation and/or a usage condition. By combining multiple license policies it is possible to define arbitrary aspects of access regulations and usage conditions. This serves to best match the consumer's needs.

A license may refer to a single, entire contract or to one or multiple contract items.

A representation of a license can either be embedded in a contract representation or can be implemented as a separate document, which is logically linked to a contract. The following listing shows an XML representation of a license, which is embedded in a contract document:

```
<UsageContractDoc
        name = MyUsageContract
        identitykey = 313c4dbb-14aa-47c3-84b8- 101718f60116
        startdate = 2002-07-01 00:00:00.000000000
        enddate = 2003-07-01 00:00:00.000000000>
    <services>
        <service servicekey = 0c1f2376-043a-4294-a6ef-0c131cf2243a
            ratingkeys = 3312d44b-3163-4d42-bd5e-366d305e2914 />
        <service servicekey = 3ec01bb7-331e-4e89-8256-3e0b0c3b1335
            ratingkeys = 1a2fdeed-026c-47a9-be32-2fb63896303d />
    </services>
    <license>
    <license_policy type = Named>
        <identitykey>
            4412d44b-3163-4d42-bd5e-366d305e999
        </identitykey>
    </license_policy>
    <license_policy type = Consumptive>
        <maxRequests>
            1000
        </maxRequests>
    </license_policy>
    <license_policy type = UsageCondition>
        <usageCondition>
            ResellingNotAllowed
        </usageCondition>
    </license_policy>
    </license>
</UsageContractDoc>
End of Listing
```

The following examples show, how atomic license policies can be combined according to a preferred aspect of the present invention to form a new license. The atomic policy types used are "basic", "named", "concurrent", "consumptive", and "timed"; further atomic license policy types are also possible, as a person skilled in the art may appreciate.

In the examples, the licenses are defined inside usage contracts. In this case, the license service 75A will use the information provided by the contract service 74A together with the metering data from the metering service 76A to make a decision at runtime about the validity of the license. This inventional approach allows the easy creation of personalized licenses. Of course it is also possible to modify this inventional approach in several ways, for instance that the license service 75A acts upon information stored in a license database and only links to a license stored in this database are part of the contract.

Example 1

```
<UsageContractDoc
    name = SampleContract1
    identitykey = 313c4dbb-14aa-47c3-84b8101718f60116
    startdate = 2002-07-01 00:00:00.000000000
    enddate = 2003-07-01 00:00:00.000000000 >
<services>
    <service servicekey = 0c1f2376-043a-4294-a6ef-0c131cf2243
    ratingkeys = 3312d44b-3163-4d42-bd5e-366d305e291 />
    <service servicekey = 3ec01bb7-331e-4e89-8256-3e0b0c3b133
    ratingkeys = 1a2fdeed-026c-47a9-be32-2fb63896303 />
</services>
<license>
    <license_policy type = Named>
        <identity> Donald Duck </identity>
        <identity> Mickey Mouse </identity>
    </license_policy>
        <license_policy type = Consumptive>
        <maxRequestsPerMonth> 1000 </maxRequestsPerMonth>
    </license_policy>
        <license_policy type = UsageCondition>
            no reselling allowed
    </license_policy>
</license>
</UsageContractDoc>
```

In the example above a license is defined by combining the atomic license policy types "named" mentioning exemplarily Donald Duck and Mickey Mouse, "consumptive", delimiting the maximum number of requests per month to 1000, and "Usage condition", mentioning that no reselling of the service is allowed. While the first two license components can be technically enforced, the type usage condition defines a common understanding between the involved parties.

Named:

Through the named license policy, two persons (Donald Duck and Mickey Mouse) are allowed to use the services subscribed to by the contract.

Consumptive:

The consumptive license policy allows 1000 calls per month to the service subscribed to by the contract.

Usage Condition:

This license policy forbids the reselling of the services subscribed to by the contract.

By combining these atomic license policies to form a new license, only the persons listed in the named license policy can use the services subscribed to by the contract for a total of 1000 calls per month.

Example 2

```
<UsageContractDoc
        name = SampleContract2
        identitykey = 313c4dbb-14aa-47c3-84b8- 101718f60116
        startdate = 2002-07-01 00:00:00.000000000
        enddate = 2003-07-01 00:00:00.000000000 >
<services>
    <service servicekey = 0c1f2376-043a-4294-a6ef- 0c131cf2243
        ratingkeys = 3312d44b-3163-4d42-bd5e- 366d305e291 />
    <service servicekey = 3ec01bb7-331e-4e89-8256- 3e0b0c3b133
        ratingkeys = 1a2fdeed-026c-47a9-be32- 2fb63896303 />
</services>
<license>
    <license_policy type = Named>
        <identity> Donald Duck </identity>
        <identity> Mickey Mouse </identity>
        <identity> Superman </identity>
    </license_policy>
        <license_policy type = Concurrent>
            <maxConcurrentRequests> 1 </maxConcurrentRequests>
    </license_policy>
</license>
</UsageContractDoc>
```

In the example above a license is defined by combining the atomic license policy types "named" and "concurrent". Both license components can be technically enforced.

Named:

Through the named license policy, three persons (Donald Duck, Mickey Mouse and Superman) are allowed to use the services subscribed to by the contract.

Concurrent:

The concurrent license policy allows only one single call at a time to the service subscribed to by the contract.

By combining these atomic license policies to form a new license, only one call at a time by any of the persons listed in the named license policy can be done to the services subscribed to by the contract. If the system is currently processing a call to any of these services, no other call (even from another of the listed persons) will succeed.

Example 3

```
<UsageContractDoc
        name = SampleContract3
        identitykey = 313c4dbb-14aa-47c3-84b8- 101718f60116
        startdate = 2002-07-01 00:00:00.000000000
        enddate = 2003-07-01 00:00:00.000000000 >
<services>
    <service servicekey = 0c1f2376-043a-4294-a6ef- 0c131cf2243
        ratingkeys = 3312d44b-3163-4d42-bd5e- 366d305e291 />
    <service servicekey = 3ec01bb7-331e-4e89-8256- 3e0b0c3b133
        ratingkeys = 1a2fdeed-026c-47a9-be32- 2fb63896303 />
</services>
<license>
    <license_policy type = TimeBased>
        <allowedtime>
            <starttime> 09:00:00 </starttime>
            <endtime> 12:00:00 </endtime>
        </allowedtime>
        <allowedtime>
            <starttime> 18:00:00 </starttime>
            <endtime> 22:00:00 </endtime>
        </allowedtime>
    </license_policy>
    <license_policy type = Concurrent>
        <maxConcurrentRequests> 2 </maxConcurrentRequests>
    </license_policy>
    <license_policy type = Consumptive>
    <maxRequestsPerMonth> 500 </maxRequestsPerMonth>
    </license_policy>
</license>
</UsageContractDoc>
```

In the example above a license is defined by combining the atomic license policy types "time based", "concurrent" and "consumptive". All license components can be technically enforced.

Time Based:

Through the time based license policy, the timeframe during which the services can be requested is specified as 9 to 12 o'clock and 18 to 22 o'clock.

Concurrent:

The concurrent license policy allows only two calls at a time to the service subscribed to by the contract.

Consumptive:

The consumptive license policy allows 1000 calls to the service subscribed to by the contract.

By combining these atomic license policies the following new license is created: Calls to any of the services subscribed to by the contract can only be made in the timeframes specified under the policy type "time based". But even within the times listed there, only two calls can be made simultaneously, while no more than 500 calls per month are possible at all.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:

a) conversion to another language, code or notation;
b) reproduction in a different material form.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method for providing licensed access to software application services based on a contract that specifies conditions for usage of the software application services by a service requester, access to the software application services being provided over a network under different license types, each license type defining a particular usage condition, the method comprising:

a service handler receiving a service request for an application service, the service handler implementing a runtime environment within an application server memory space that is operatively shared by the service handler, a profile handler, a contract handler, and a metering handler;

responsive to receiving the service request, the service handler:

retrieving service requester profile data associated with the service request from a profile service component;

retrieving, from the contract handler, an identified and validated contract associated with the service request by utilizing the retrieved requester profile data;

receiving, from a licensing service component, license condition data corresponding to the identified contract; and retrieving, from a contract services component, contract information corresponding to the identified and validated contract;

receiving, by the licensing service component, service usage data from a metering service component that receives and collects application service usage data from the metering handler;

comparing, by the licensing service component, the received service usage data with the received license condition data and determining availability of two or more licensing options to satisfy the service request based upon the comparing and providing the service in accordance with one of the licensing options.

2. The method according to claim 1, further comprising providing a software application service to the service requester in accordance with the determined availability of the two or more licensing options.

3. The method according to claim 1, wherein the two or more license options are from a group of license types, the group including a:

consumptive license type, the consumptive license type being a license type in which only a specific number of requests for the service are allowed;

concurrent license type, the concurrent license type being a license type in which only a specific number of simultaneously requests for the service for the service are allowed;

time-based license type, the time-based license type being a license type in which service requests are allowed only at specific times;

person-related license type, the person-related license type being a license type in which only predefined individuals listed therein are allowed to request the service;

restriction-free license type, and usage condition license type; and usage condition license type.

4. The method according to claim 1, wherein in response to receiving the service request:
   calculating a usage consumption of services by the service requester, and
   rejecting the request when the calculated usage consumption is more than a predefined usage consumption.

5. The method according to claim 1, wherein the metering handler meters said provision of the software application service and generates resultant meter events collected and stored by the metering service component.

6. A computer program product stored on a non-transitory computer usable medium for providing licensed access to software application services based on a contract that specifies conditions for usage of the software application services by a service requester, access to the software application services being provided over a network under different license types, each license type defining a particular usage condition, the computer program product comprising computer executable instructions for implementing:
   a service handler receiving a service request for an application service, the service handler implementing a runtime environment within an application server memory space that is operatively shared by the service handler, a profile handler, a contract handler, and a metering handler;
   responsive to receiving the service request, the service handler:
      retrieving service requester profile data associated with the service request from a profile service component;
      retrieving, from the contract handler, an identified and validated contract associated with the service request by utilizing the retrieved requester profile data;
      receiving, from a licensing service component, license condition data corresponding to the identified contract; and
      retrieving, from a contract services component, contract information corresponding to the identified and validated contract;
   receiving, by the licensing service component, service usage data from a metering service component that receives and collects application service usage data from the metering handler;
   comparing, by the licensing service component, the received service usage data with the received license condition data and determining availability of two or more licensing options to satisfy the service request based upon the comparing and
   providing the service in accordance with one of the licensing options.

7. The computer program product according to claim 6, wherein the computer-executable instructions further implement providing a software application service to the service requester in accordance with the determined availability of the two or more licensing options.

8. The computer program product according to claim 6, wherein the two or more license options are from a group of license types, the group including a:
   consumptive license type, the consumptive license type being a license type in which only a specific number of requests for the service are allowed;
   concurrent license type, the concurrent license type being a license type in which only a specific number of simultaneously requests for the service for the service are allowed;
   time-based license type, the time-based license type being a license type in which service requests are allowed only at specific times;
   person-related license type, the person-related license type being a license type in which only predefined individuals listed therein are allowed to request the service;
   restriction-free license type, and usage condition license type; and
   usage condition license type.

9. The computer program product according to claim 6, wherein in response to receiving the service request:
   calculating a usage consumption of services by the service requester; and
   rejecting the request when the calculated usage consumption is more than a predefined usage consumption.

10. The computer program product according to claim 6, wherein the metering handler meters said provision of the software application service and generates resultant meter events collected and stored by the metering service component.

11. A apparatus for providing licensed access to software application services based on a contract that specifies conditions for usage of the software application services by a service requester, access to the software application services being provided over a network under different license types, each license type defining a particular usage condition, the method comprising:
   a plurality of processors;
   a tangible, computer readable storage medium, coupled to the plurality of processors; and
   logic, stored on the tangible, computer readable storage medium for execution on the plurality of processor, implementing a method, the method comprising:
      a service handler receiving a service request for an application service, the service handler implementing a runtime environment within an application server memory space that is operatively shared by the service handler, a profile handler, a contract handler, and a metering handler;
   responsive to receiving the service request, the service handler:
      retrieving service requester profile data associated with the service request from a profile service component;
      retrieving, from the contract handler, an identified and validated contract associated with the service request by utilizing the retrieved requester profile data;
      receiving, from a licensing service component, license condition data corresponding to the identified contract; and
      retrieving, from a contract services component, contract information corresponding to the identified and validated contract:
   receiving, by the licensing service component, service usage data from a metering service component that receives and collects application service usage data from the metering handler;
   comparing, by the licensing service component, the received service usage data with the received license condition data and determining availability of two or more licensing options to satisfy the service request based upon the comparing and
   providing the service in accordance with one of the licensing options.

12. The apparatus according to claim 11, the logic further comprising logic for providing a software application service to the service requester in accordance with the determined availability of the two or more licensing options.

13. The method according to claim 11, wherein the two or more license options are from a group of license types, the group including a:
- consumptive license type, the consumptive license type being a license type in which only a specific number of requests for the service are allowed;
- concurrent license type, the concurrent license type being a license type in which only a specific number of simultaneously requests for the service for the service are allowed;
- time-based license type, the time-based license type being a license type in which service requests are allowed only at specific times;
- person-related license type, the person-related license type being a license type in which only predefined individuals listed therein are allowed to request the service;
- restriction-free license type, and usage condition license type; and
- usage condition license type.

14. The method according to claim 11, wherein in response to receiving the service request:
- calculating a usage consumption of services by the service requester; and
- rejecting the request when the calculated usage consumption is more than a predefined usage consumption.

15. The method according to claim 1, wherein the metering handler meters said provision of the software application service and generates resultant meter events collected and stored by the metering service component.

\* \* \* \* \*

UNITED STATES PATENT AND TRADEMARK OFFICE
CERTIFICATE OF CORRECTION

| | |
|---|---|
| PATENT NO. | : 11,157,915 B2 |
| APPLICATION NO. | : 16/653125 |
| DATED | : October 26, 2021 |
| INVENTOR(S) | : Joachim Bruchlos et al. |

It is certified that error appears in the above-identified patent and that said Letters Patent is hereby corrected as shown below:

On the Title Page

Item (73), assignee, address, after "Green Market Square Limited", insert --, Road Town (VG)--.

Signed and Sealed this
Seventh Day of June, 2022

Katherine Kelly Vidal
*Director of the United States Patent and Trademark Office*